March 17, 1970 J. P. WOODS ET AL 3,501,756

LAMINATED MAGNETIC TRANSDUCER WITH BOBBIN STRUCTURE

Original Filed Aug. 29, 1962 4 Sheets-Sheet 1

INVENTORS.
John P. Woods.
Clifford D. Dransfield.
Henry R. Barta.

LAMINATED MAGNETIC TRANSDUCER WITH BOBBIN STRUCTURE

Original Filed Aug. 29, 1962 4 Sheets-Sheet 2

INVENTORS.
John P. Woods.
Clifford D. Dransfield.
Henry R. Barta.

LAMINATED MAGNETIC TRANSDUCER WITH BOBBIN STRUCTURE

INVENTORS.
John P. Woods.
Clifford D. Dransfield.
Henry R. Barta.

INVENTORS.
John P. Woods.
Clifford D. Dransfield.
Henry R. Barta.

United States Patent Office 3,501,756

Patented Mar. 17, 1970

3,501,756

LAMINATED MAGNETIC TRANSDUCER WITH BOBBIN STRUCTURE

John P. Woods, Anchorage, Alaska, and Clifford D. Dransfield and Henry R. Barta, Dallas, Tex., assignors to Atlantic Richfield Company, Philadelphia, Pa., a corporation of Pennsylvania Original application Aug. 29, 1962, Ser. No. 220,242, now Patent No. 3,375,574, dated Apr. 2, 1968. Divided and this application Mar. 5, 1968, Ser. No. 710,568

Int. Cl. G11b *5/00;* G01d *15/06*

U.S. Cl. 340—174.1 23 Claims

ABSTRACT OF THE DISCLOSURE

A magnetic transducer comprised of an interior subassembly inside of a case containing a metal suitable for protecting the subassembly from external magnetic fields. The subassembly includes a pair of bobbins with a separate L-shaped pole piece partially located within each bobbin. The pole pieces are comprised of facing L-shaped magnetic laminations which may have a flux concentrating groove or nose. Corresponding legs of the L-shaped magnetic laminations of each pole piece are connected by rectangular shaped magnetic laminations placed in first indentations in the bobbins. The corresponding legs may be so arranged that a short lamination corresponds to a longer lamination in the other pole piece. A coil in a second indentation in each bobbin encircles a leg of each pole piece. A plastic material holds the subassembly in place. Other features of the transducer are mentioned.

Cross-reference to related application

This is a division of copending application Ser. No. 220,242, filed August 29, 1962, now Patent No. 3,375,574.

Background of the invention

The present invention relates to an improved magnetic recording and reproducing transducer. The improved magnetic recording and reproducing transducer is especially suited for operation with a delay drum. For purposes of simplicity, magnetic recording and reproducing transducers will be hereinafter referred to as magnetic transducers.

To date, many types of computers and automatic data processing equipment require the use of delay drums. Since delay drums operate continuously and usually at much higher speeds than most magnetic recording systems, the recording surfaces of the delay drums and the magnetic transducers working therewith are subject to excessive wear. Conventionally, this wear is reduced by separating the transducer from the recording surface with an air cushion. Many and varied magnetic transducers have been developed to operate through an air cushion with delay drums rotating at various speeds; however, to date, a completely satisfactory transducer has not been produced.

This invention provides an improved magnetic transducer which lends itself to mass production techniques without lowering the quality of the transducer which is suitable for operation with a high speed delay drum. The transducer is extremely rugged and will perform well without contacting the recording drum since the transducer has improved operational characteristics, such as field strength and protection from external fields. The transducer also provides for a plurality of heads in a bank with all of the head gaps in proper alignment.

Summary of the invention

This invention provides an improved magnetic transducer especially suited for used with high speed delay drums. The magnetic transducer has an interior subassembly positioned in a case with a plastic material inside of the case surrounding a portion of the subassembly. The case contains a metal suitable for protecting the subassembly from external magnetic fields. Preferably, the case is constructed by nesting a plurality of five-sided containers arranged in a manner to protect the subassembly from external fields.

The subassembly is made up of first and second bobbins contacting each other along mating sides. Preferably, the bobbins are pressure injection molded. Each bobbin has corresponding features which include an aperture extending generally along a portion of the longitudinal axis of the bobbin into a first indentation in the bobbin. This first indentation extends inward from the mating side and, preferably, from an end of the bobbin. The first indentations in the two bobbins are in general alignment and form a cavity for receiving the hereinafter mentioned rectangular magnetic laminations. There is a second indentation which is separated from the aperture and in which a coil will be wound around a portion of the aperture as hereinafter mentioned. Preferably, the second indentations will extend around at least a portion of the apertures in the first and second bobbins.

The subassembly also includes a first and a second generally L-shaped pole piece; therefore, each pole piece has a first and a second leg. Part of the first leg of the first pole piece is located within the aperture in the first bobbin and part of the first leg of the second pole piece is located within the aperture in the second bobbin. The ends of the second legs of the pole pieces are in face-to-face relationship with each other thereby forming confronting tips. A portion of these confronting tips are exposed since they extend beyond the case positioned around the subassembly. The L-shaped pole pieces are comprised of a plurality of generally L-shaped magnetic laminations.

A group of generally rectangular shaped magetic laminations are positioned in the cavity formed by the first indentations in the mated bobbins. These rectangular magnetic laminations contact corresponding L-shaped magnetic laminations in each pole piece. If desired, each rectangular shaped magnetic lamination may be permanently fixed to at least one of the L-shaped magnetic laminations in each of the L-shaped pole pieces.

A first coil having first and second ends and composed of electrically conductive windings is positioned in the second indentation in the first bobbin with at least a portion of the first coil around the aperture and the first leg of the pole piece in the first bobbin. A second coil of similar properties and location is positioned in the second indentation in the second bobbin.

The magnetic transducer may include a plurality of interior subassemblies within a single case.

The confronting tips of the second legs of the L-shaped pole pieces may each have a nose projecting generally along the longitudinal axis of the transducer in a direction outward from the case. These noses are a signal concentrating feature of the transducer.

Another flux control feature involves the shape of an edge of the pole pieces. Portions of corresponding edges of the second legs of each pole piece may form a generally V-shaped groove with the confronting tips being at the bottom or point of the groove. These corresponding edges are the inner edges of the second legs.

The quality of the transducer and ease of assembly of transducer is enhanced by forming the first and second L-shaped pole pieces with L-shaped magnetic laminations having first legs alternating between long first legs and shorter first legs. Each long first leg of an L-shaped magnetic lamination in a pole piece is arranged to correspond to a short first leg of an L-shaped magnetic lamination in the other pole piece. The rectangular shaped magnetic lamination connecting the corresponding short and long first legs will be positioned to contact the end edge of the short first leg and the side edge of the corresponding long first leg. When the transducer is assembled in this manner, the L-shaped and rectangular laminations will be of the same thickness and the flat sides of the rectangular magnetic laminations combine with the flat sides of longer first legs and with each other to improve the properties of the transducer. It is preferred that the number of rectangular magnetic laminations equal the number of L-shaped magnetic laminations in both pole pieces and that the width of the rectangular magnetic laminations be equal to the difference in length between adjacent long and short first legs of adjacent L-shaped magnetic laminations.

Each bobbin of the subassembly may have a third indentation on the side of the bobbin opposite the mating side. This third indentation is separated from the second indentation by a portion of the bobbin. Two passageways extend longitudinally through this separating portion and provide communication between the second and third indentations. An end of the coil is passed from the second indentation through each passageway to the third indentation. Preferably, for improved strength and quality, two terminal posts are mounted in the bottom of the third indentation and an end of the coil is connected to each terminal post. There may also be provided a tubular sleeve extending longitudinally outward from the rear end of the bobbin opposite the confronting tips of the pole pieces. This tubular sleeve will extend through holes in the case and provides for improved alignment, strength and handling of the bobbins in the subassembly. This tubular sleeve will communicate with the third indentation in bobbins having a third indentation and terminal wires may be passed through this sleeve and connected to the terminal posts mounted in the bottom of the third indentation.

Description of preferred embodiments

Refer now to FIGURES 1 through 9 which illustrate the magnetic transducer and the various components used in assembling the improved magnetic transducer.

Figure 1:
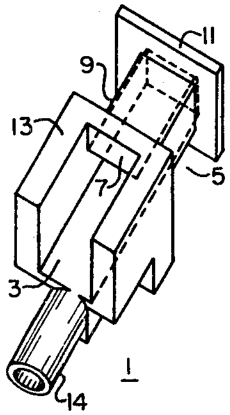
FIGURES 1 through 9, inclusive, illustrate the various component parts of the improved magnetic transducer and aid in illustrating how the transducer is assembled.
Figure 2:
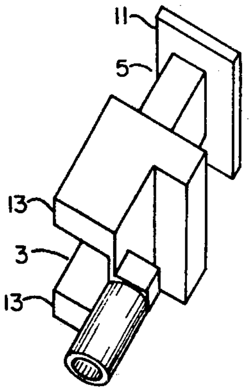
Figure 3:
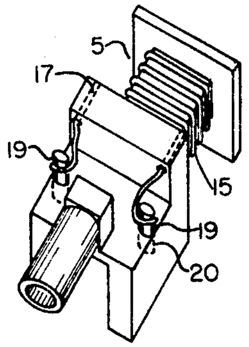

FIGURES 1 through 3 show three isometric views of improved bobbin 1 rotated 90 degrees from each other about the longitudinal axis of the bobbin. The bobbin is made of a pressure injection molded, non-conductive plastic or resinous materials such as nylon, polystyrene, epoxy-type resins or the like formed in a generally rectangular configuration. Bobbin 1 has surfaces forming first indentation 3 in one portion of the bobbin which is made to accommodate a portion of a group of rectangular magnetic laminations which cooperate with pole pieces to complete the magnetic circuit as will be described hereinafter. Bobbin 1 also has surfaces forming second indentation 5 in another portion of bobbin which is adapted to accommodate an electrical coil. Aperture 7 extends from the lower or front end of the bobbin along a portion of the longitudinal axis of the bobbin into first indentation 3. For purposes of simplicity, aperture or tunnel 7 is shown in FIGURE 1 only. Walls 9 separate aperture 7 from second indentation 5 which extends around the aperture.

Figure 7:
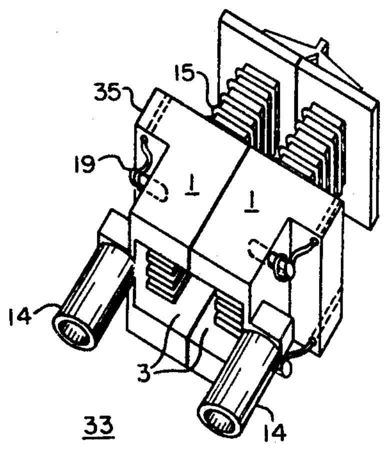

The mating side of bobbin 1 is shown in FIGURE 1 as extreme top surfaces 11 and 13. These surfaces are in the same plane and are arranged so they will mate with corresponding surfaces of a second bobbin having similar features and as shown in FIGURE 7. First indentation 3 extends inward from the mating sides and from a top or rearward end of bobbin to communicate with aperture 7. The two first indentations in the two mated bobbins are in general alignment thereby forming a cavity for receiving the hereinafter described rectangular magnetic laminations.

Also, as shown in FIGURE 7, the two second indentations are in alignment so that they extend around portions of the apertures in the first and second mated bobbins.

As shown, optional tubular sleeve 14 extends longitudinally outward from the rear end of the bobbin. This tubular sleeve improves alignment, strength and handling of the bobbins and is used to accommodate terminal wires that connect a coil mounted on indentation 5 with an exterior circuit as will be hereinafter described.

FIGURE 3 shows bobbin 1 with its coil 15 mounted in coil or second indentation 5. For illustrative purposes, coil 15 may include 880 turns of enamel-covered wire of approximately 60 ohms resistance. FIGURE 3 shows coil lead holes or passageways 17 penetrating a portion of bobbin 1 along its longitudinal axis. As illustrated, these passageways extend longitudinally through a portion of the bobbin separating second indentation 5 from a third indentation formed by the surfaces of the bobbin and provide communication between the two indentations. Coil 15 has a first and a second end and one end is passed from the second indentation through each passageway to the third indentation.

Terminal posts 19 are positioned or mounted in the bottom portion of third indentation in a manner to permit an end of coil 15 to be connected to a terminal post. Tubular sleeve 14 also communicates with or opens into this third indentation so that external wires (not shown) may be connected to terminal posts 19. If excessive pressure or force is applied to the exterior wires, terminal posts 19 prevent breaking or shifting of the delicate wires in coil 15.

Figure 4:
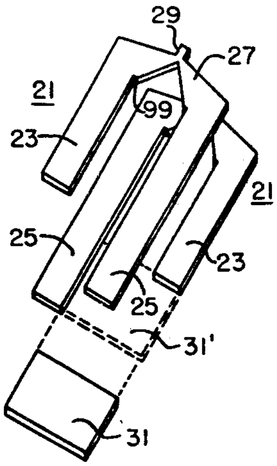

FIGURE 4 shows two unitary, generally U-shaped magnetic laminations 21. For purposes of this application, the term magnetic laminations includes thin strips of magnetic material suitable for use in constructing pole pieces for magnetic transducers. Specifically, the magnetic material includes transformer steel, hydrogen annealed molybdenum permalloy, etc. A plurality of these magnetic laminations are combined to produce the pole pieces for the magnetic transducer as will be described hereinafter. Each U-shaped lamination 21 includes short leg 23 and longer leg 25 joined by base 27 with center nose 29, which is optional. The configuration of base 27 and nose 29 will be described in detail hereinafter. When nose 29 is split along the longitudinal axis of the transducer in the manner hereinafter prescribed, the U-shaped lamination will be split into two L-shaped magnetic laminations having first and second legs. Short leg 23 will be the first leg of one L-shaped magnetic lamination in a first pole piece and longer leg 25 will be the first leg of the corresponding L-shaped magnetic lamination in a second pole piece. The two second legs of the two L-shaped magnetic laminations created by splitting the U-shaped lamination will be in face-to-face relationship and form confronting pole tips. If nose 29 is present and is split, the confronting pole tips will each have a nose projecting generally along the longitudinal axis of the transducer in a direction outward or downward from the hereinafter described case.

Figure 5:
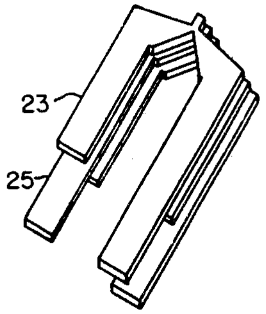

This configuration of nose 29 concentrates the magnetic flux and improves the operational characteristics of the magnetic transducer. That is, the concentration of magnetic flux in the small area of the nose records signals in smaller areas on the recording surface. In addition, the nose provides an increased output voltage during readout operations. Generally about nine U-shaped laminations 21 are employed to produce the first and second laminated L-shaped pole pieces. The exact number is determined by the thickness of U-shaped laminations 21, the size of aperture 7, and the over-all operational transducer qualities desired. The illustrated embodiment utilizes laminations which are about 0.014 inch thick. U-shaped laminations 21 are preferably made by milling stacks of from about 10 to several hundred laminations to produce the same configuration and to achieve efficiency of operation. When U-shaped laminations 21 are positioned in bobbins 1, they are stacked as shown in FIGURE 5 so that shorter legs 23 alternately appear on each side of the stack. By the same token, longer legs 25 alternately appear on each side of the stack. Thus, when the U-shaped lamination is split, a longer first leg of an L-shaped magnetic lamination in one pole piece has a corresponding shorter first leg of an L-shaped magnetic lamination in the other pole piece. This arrangement allows a group of generally rectangular shaped magnetic laminations 31, shown in FIGURE 4, to fit between adjacent legs 23 and 25 of U-shaped laminations 21 as shown by 31 to complete the magnetic path in each U-shaped lamination 21. For purposes of simplicity only one rectangular lamination 31 of the group is shown; however, it is preferred that the number of rectangular magnetic laminations equal the number of U-shaped laminations 21, or in other words, the number of rectangular magnetic laminations 31 will equal the number of L-shaped magnetic laminations in each pole piece after the U-shaped magnetic laminations have been split.

As shown, the rectangular shaped magnetic laminations are positioned and sized to contact the end edge of short leg 23 of one L-shaped magnetic lamination in one pole piece and to contact the side edge of the corresponding longer leg 25 of the L-shaped magnetic lamination in the other pole piece. Thus, the preferred length of each rectangular magnetic lamination 31 is equal to the distance between the outer extremity or edge of short leg 23 and the inner extremity or side edge of longer leg 25. Similarly, it is preferred that the width of each rectangular magnetic lamination 31 be designed to extend a distance equal to the difference between the lengths of adjacent short leg 23 and longer leg 25. Of course, it is also desirable that the thickness of each rectangular magnetic lamination be equal to the thickness of U-shaped lamination 21.

Figure 6:
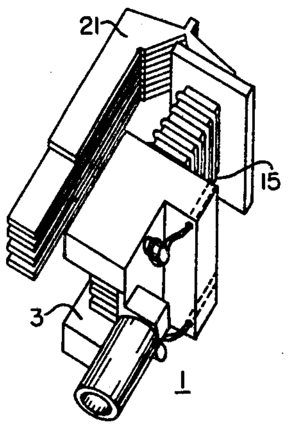

FIGURE 6 illustrates how bobbin 1 mounting coil 15 accommodates U-shaped laminations 21. Of course, the entire group of U-shaped laminations 21 may be inserted into one or both bobbins simultaneously or individual laminations may be so inserted. U-shaped laminations 21 are positioned in the first and second bobbins, as illustrated in FIGURES 6 and 7, so that at least a part of short legs 23 and longer legs 25 will be located within aperture 7. As a result, when the U-shaped laminations are split as hereinafter described, the U-shaped laminations will be divided into two laminated L-shaped pole pieces whose first legs are at least partially in aperture 7 and whose second legs are in face-to-face relationship thereby forming confronting pole tips.

Figures 8, 9:
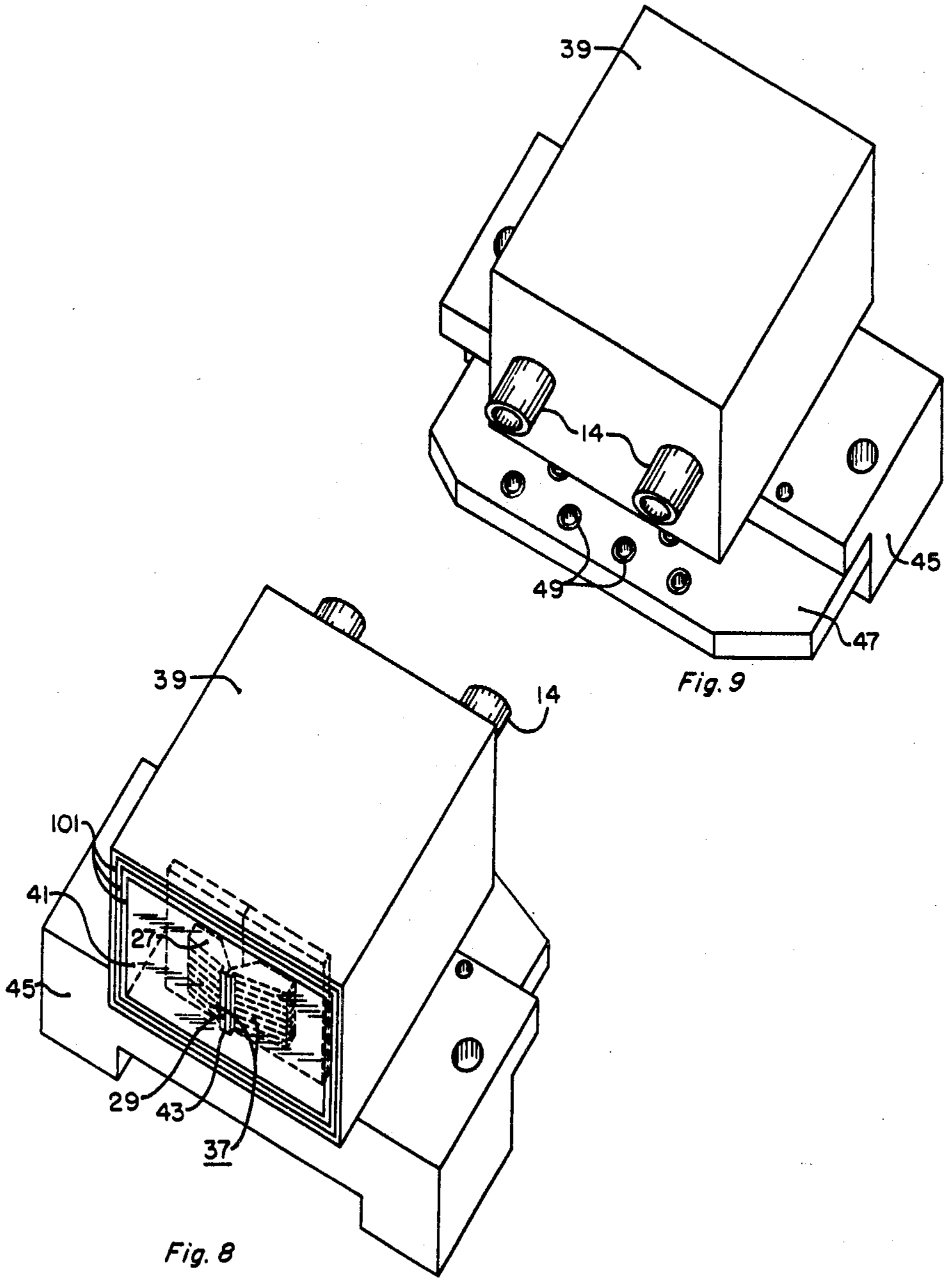

FIGURE 7 illustrates a complete magnetic transducer interior subassembly 33; however, laminations 31 are not shown for purposes of simplicity. The subassembly includes two bobbins 1 positioned so their mating sides are in face-to-face relationship, that is, in contact with each other. In this position the bobbins' respective first indentations 3 form a cavity to receive rectangular laminations 31 which contact the first legs of the L-shaped laminations formed by splitting U-shaped laminations 21 as described heretofore. Terminal posts 19 are protected by projection 35 forming part a secondary side of bobbin 1 and separating the second indentation from the third indentation. Optional sleeves 14 are used to house exterior wires, not shown, connected to terminal posts 19. Reference will be hereafter made to FIGURE 9 for the position of sleeves 14 in the finished transducer.

FIGURE 8 is a view showing the operating end of the completed magnetic transducer. U-shaped laminations 21 have been modified or split, as will be described hereinafter, to produce L-shaped pole pieces 37. For purposes of simplicity only a portion of the magnetic transducer's interior subassembly 33 is shown. L-shaped pole pieces 37 are shown positioned within case 39 which is around the interior subassembly in a manner adapted to expose a portion of the confronting tips of L-shaped pole pieces 37. As shown, the exposed portion is a portion of noses 29 which extends outward beyond cementing material 41. The cementing material may be a suitable plastic or potting material 41. This material surrounds a portion of L-shaped pole pieces 37 and separates same from case 39 which contains a metal suitable for protecting the assembly from external magnetic fields. Air gap 43 is shown separating the confronting pole tips of pole pieces 37. Mounting bracket 45 is one type of bracket that may be attached to case 39.

FIGURE 9 is a bottom view of FIGURE 8. Sleeves 14 are shown extending through case 39 which is positioned around the subassembly. These sleeves improve alignment, strength and handling of the subassembly. Printed circuit board 47 can be connected to bracket 45 by securing means passed through holes shown in bracket 45. Board 47 serves as a convenient means for providing a parallel or series connection between the two coils 15 mounted in interior subassembly 33. Exterior wires, not shown, are connected to terminal posts 19, FIGURE 7, and passed through sleeves 14, FIGURE 9, to various eyelets 49 dependings on the connection desired between coils 15. The actual printed connections on board 47 are located on the reverse of the board as shown. It is to be understood that bracket 45 and printed circuit board 49 are not essential to the operation of the transducer and serve merely as optional accessories.

Figure 10:
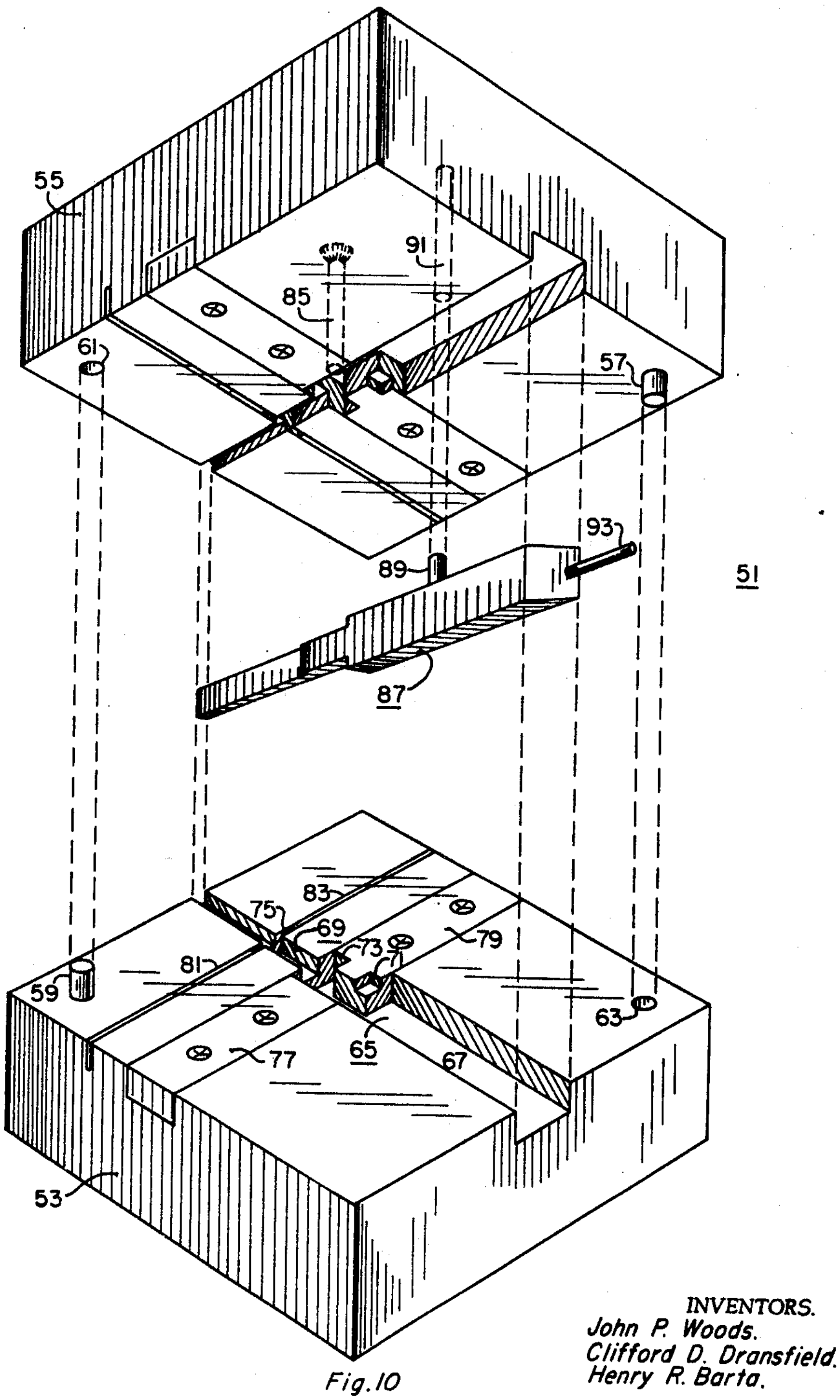
FIGURE 10 shows a detailed drawing of the pressure injection mold used to produce the bobbin shown in FIGURES 1 and 2.

FIGURE 10 represents a pressure injection mold suitable for forming bobbins 1. Mold 51 is composed of a first section 53 and a second section 55. Dowels 57 and 59 are adapted to cooperate with holes 61 and 63. First section 53 contains a substantially rectangular depression 65 extending the extent of one dimension of the section. Depression 65 includes a relatively deep, wide cavity 67 and a relatively shallow, narrow cavity 69 extending from 67. Cavity 67 includes notch 71 and indentation 73. Cavity 69 includes indentation 75 that extends on both sides of 69. Section 55 contains a mirror image of depression 65. Blocks 77 and 79 inserted in and secured to 53 as shown facilitate the machining of depression 65 in section 53. Blocks 81 and 83 are inserts that simplify the machining of 75. Pressure injection aperture 85 is used to fill the mold depression. Metallic core 87 has a generally rectangular configuration and is used to cooperate with the depressions in sections 53 and 55 to form bobbin 1. Core 87 fits in depression 65 as shown in FIGURE 10. Dowel 89 fits into hole 91 as shown to aid in positioning the core. Pin 93 is optional and is used to aid in freeing the core from mold section 53.

Figure 11:
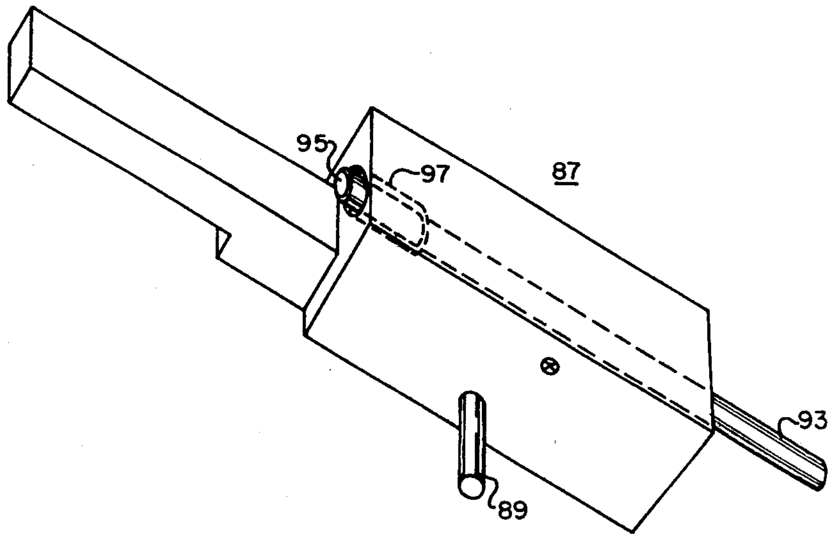
FIGURE 11 shows a detailed drawing of the removable core used in the injection mold.

FIGURE 11 shows a detailed drawing of core 87. Pin 95 is shown projecting out of hole 97 in the core. This pin may or may be part of pin 93. Pin 95 and hole 97 cooperated with notch 71 in sections 53 and 55 to produce sleeve 14, FIGURE 1.

After much experimentation it has been found that a complicated component such as bobbin 1 shown in FIGURES 1 through 3 can best be produced by pressure injection molding such as illustrated in FIGURE 10. To produce the same bobbin by potting, machining or other conventional bobbin-making operation requires excessive labor and expense. For instance, if the bobbin is produced by machining operations, average production amounts to about one bobbin per machinist every three hours. Potting is equally impractical since a relatively long setting or curing period is required. In addition the potting operation cannot produce the extremely thin walls 9 that are required to separate coil 15, FIGURE 7, from magnetic laminations 21. For best operation of the transducer, wall 9 should range from about 0.004 to 0.015 inch thick. When a pressure injection mold such as shown in FIGURE 10 is utilized to produce the bobbins, average production can range up to about 35 bobbins per mold per hour. The pressure injected plastic is forced into the mold under a pressure of about 4,000 p.s.i. so that thin walls 9, FIGURE 1, are produced and the entire bobbin is formed within a matter of seconds. Since the operation utilizes a cold mold, the plastic dries instantly and the bobbin can be removed immediately after injection.

Consider now, in detail, how the magnetic transducer as illustrated in the drawings is assembled. The illustrated transducer is designed for optimum operation with delay drums rotating at recording surface speeds of between approximately 150 inches per second to 1200 inches per second. Molten nylon is pressure injected through aperture 85 into depression 65 in mold 51, FIGURE 10, to form bobbins 1, FIGURE 1. Each bobbin's over-all length is approximately 0.75 inch and maximum width is approximately 0.30 inch. After the molding operation, flashings are removed, coil lead holes 17, FIGURE 3, are drilled and terminal post holes 20 are drilled and tapped in each bobbin. The lead and terminal post holes can be molded instead of drilled; however, this complicates mold 51 considerably. Regardless of the way the holes are made, terminal posts 19 are then placed in each tapped hole and 880 turns of "Bondex" enamel-covered copper wire No. 40, made by Essex Wire Corp., of Fort Wayne, Ind., are wound around indentation 5 on each bobbin. The winding operation is preferably done automatically by a conventional "off the shelf" coil winder. The ends of each winding 15 are positioned through lead holes 17 and soldered to terminal posts 19. Terminal posts 19 are screwed into the bobbin so that if excessive pressure is applied to the exterior wires the post will not move and break the fine copper wire. The generally U-shaped laminations 21, FIGURE 4, are conveniently made by operating simultaneously on a stack of silicon transformer steel stock, each piece of stock measuring approximately 0.375 by 0.75 by 0.014 inch. The number of pieces in the stack usually range from 10 to 200 and are placed in a suitable milling fixture so that an inside rectangular channel approximately 0.531 by 0.156 inch is milled in the stack. Next a 60 degree V groove is miled to a depth of about 0.093 inch in the bottom of the channel; that is, in base 27 of each lamination in the stack. When the U-shaped laminations are split, the second legs of the resulting L-shaped pole pieces will, therefore, have corresponding edges that form a generally V-shaped groove with the confronting tips and noses at the bottom or point of the V-shaped groove. The corresponding edges are the inner edges of the second legs. The V-shaped groove, shown in FIGURE 4, serves to concentrate the magnetic flux near the magnetic tape when the transducer is in operation. Note that shoulder 99, FIGURE 4, is produced in the second milling operation so that the edge of the bobbin can engage the shoulder and support the lamination. Thus, only a portion of the bottom of the channel or the inner edges of the second legs of the L-shaped pole pieces needs to be in the V-shaped groove. Nose 29 is approximately 0.028 inch wide by 0.035 inch long and is produced by milling the edges of bases 27 to generate angles approximately +13 degrees with a line perpendicular with legs 23 and 25. After the milling operations, the outside edge of each leg is ground so that the width of each leg is reduced to a width of approximately 0.094 inch thereby reducing the over-all width of the lamination to approximately 0.344 inch. One of the legs of each U-shaped lamination 21 is then milled to produce short leg 23 which is approximately 0.187 inch shorter than the remaining longer leg 25. Rectangular magnetic laminations 31 are produced in a similar manner; that is, a stack of silicon transformer steel stock or the like is ground to approximately 0.187 by 0.234 by 0.014 inch. Nine U-shaped laminations 21 are then positioned in apertures 7 of two bobbins 1 as shown in FIGURE 7 so that short legs 23 of adjacent laminations appear on alternate sides of the stack and the short legs are adjacent a longer leg 25. Rectangular magnetic laminations 31, FIGURE 4, are now placed in the cavity formed by the two aligned first indentations 3, FIGURE 7. One rectangular lamination 31 is placed on top of short leg 23 and extends to a side edge of longer leg 25 of each U-shaped lamination 21 so that the various legs cooperate with first indentations 3 to hold rectangular laminations 31 in their proper positions. The completed interior subassembly is now ready to be placed in its protective case 39, FIGURE 8, and potted. Case 39 contains a metal suitable for protecting the subassembly from external fields and is constructed by nesting a plurality of five-sided containers in a manner to protect the magnetic transducer from external fields. The illustrated embodiment uses a plurality of die formed cans 101 nested as shown in FIGURE 8. The inside and outside cans are made of transformer steel or the like and the center or middle can is made of copper or the like. Thus, at least two of the containers in the case are made of metal suitable for conducting external magnetic fields away from the subassembly. These two containers are separated by at least one container made of nonmagnetic material. If a single magnetic transducer is desired such as shown in FIGURES 8 and 9 a single interior subassembly is placed in container or case 39, FIGURE 8. Of course, if a bank of heads is required, the desired number of interior subassemblies can be placed in an appropriate case. In the illustrated embodiment the interior subassembly is positioned in case 39 so that sleeves 14 extend through predrilled holes in the bottom of case 39, FIGURE 9. Of course, if optional sleeves 14 are not used, interior subassembly 33 is positioned so exterior wires connecting terminal posts 19, FIGURE 7, pass through the holes in case 39, FIGURE 9. The use of sleeves 14 is preferred, however, since they aid in positioning interior subassembly 33 within case 39 before the potting operation and aid in protecting the exterior wires. It has been found that "Araldite 502," an epoxy resin produced by the Ciba Co. of New York city, provides a satisfactory potting material. In operation, the "Araldite 502" is used with a hardening material, "HN951," produced by the same company to pot the interior subassembly in its given position inside container 39 as shown in FIGURE 8. The potting material surrounds at least a portion of the exposed parts of the L-shaped pole pieces 37 and fills the voids inside and between case 39 and the subassembly.

After the potting operation, nose 29, FIGURE 4, are ground until approximately 0.003 to 0.007 inch of the nose remains. Next, the transducer is placed in a suitable jig and the air gap 43, FIGURE 8, is sawed in nose 29 and base 27 of each U-shaped lamination, as shown, to produce first and second L-shaped pole pieces 37 and their confronting pole tips. This sawing operation is best accomplished by a jeweler's saw to produce an air gap approximately 0.003 inch in width for transducers operating with the higher speed drums and an air gap approximately 0.006 inch in width for transducers operating with the lower speed drums. If a plurality of heads is positioned in the case as described above, all air gaps are produced at the same time so that they are aligned without the requirement for future manipulation of individual heads. The gap or gaps are then filled with plastic or the like to prevent foreign matter from accumulating in the air gap.

Although the transducer described above is well suited to operate with various types of magnetic recording surfaces it is best suited to operate with storage drums mounting metallic magnetic recording surfaces such as described in Patent No. 3,312,978 owned by a common assignee. Therefore, it is to be observed that although a specific embodiment of the invention has been illustrated and described for operating with drums rotating within a certain speed range and component sizes and configurations recited therewith, various modifications and substitutions may be made, which will be obvious to those skilled in the art, without departing from the scope of the present invention which is limited only by the appended claims.

What is claimed is:

1. A magnetic transducer comprising (a) an interior subassembly comprising (1) first and second bobbins contacting each other along mating sides, each of said bobbins having an aperture extending generally along a portion of the longitudinal axis and having surfaces forming first and second indentations, and a first indentation being in a first portion in communication with said aperture, said second indentation in a second portion separated from said aperture, said first indentation in said first bobbin being in general alignment with the corresponding first indentation in said second bobbin thereby forming a cavity, (2) a first and a second generally L-shaped pole piece, each of said L-shaped pole pieces having a first and a second leg and being comprised of a plurality of generally L-shaped magnetic laminations, at least part of said first leg of said first L-shaped pole piece being located within said aperture in said first bobbin, at least part of said first leg of said second L-shaped pole piece being located within said aperture in said second bobbins, the ends of said second legs of said L-shaped pole pieces being in face-to-face relationship with each other thereby forming confronting tips of said L-shaped pole pieces, (3) a group of generally rectangular shaped magnetic laminations, each of said rectangular shaped laminations positioned to contact corresponding L-shaped magnetic laminations in each of said pole pieces, at least portions of said group of magnetic laminations positioned in said cavity formed by said first indentations in said first and said second bobbins, (4) a first coil having first and second ends of electrically conductive windings positioned in said second indentation in said first bobbin, with at least a portion of said first coil around said aperture in said first bobbins, a second coil having first and second ends of electrically conductive windings positioned in said second indentation in said second bobbin, with at least a portion of said second coil around said aperture in said first bobbin, (b) a case positioned around said interior subassembly in a manner adapted to expose a portion of said confronting tips of said L-shaped pole pieces, said case containing a metal suitable for protecting said subassembly from external magnetic fields, and (c) a plastic material surrounding a portion of said L-shaped pole pieces and separating said pole pieces from said case.

2. In a magnetic transducer as set forth in claim 1 wherein the first and second bobbins are pressure injection molded.

3. In a magnetic transducer as set forth in claim 1 wherein the second indentation extends around at least a portion of the apertures in the first and second bobbins.

4. In a magnetic transducer as set forth in claim 1 wherein each of the rectangular shaped magnetic laminations is permanently fixed to at least one of the L-shaped magnetic laminations in each of said L-shaped pole pieces.

5. In a magnetic transducer as set forth in claim 1 wherein each of the confronting tips of the second legs of the L-shaped pole pieces has a nose projecting generally along the longitudinal axis of the transducer in a direction outward from the case.

6. In a magnetic transducer as set forth in claim 1 wherein the case is positioned around a plurality of the interior subassemblies.

7. In a magnetic transducer as set forth in claim 1 wherein the case is constructed of a plurality of five-sided containers with at least two of said containers being made of a metal suitable for conducting magnetic fields away from the subassembly, said two containers being separated from each other by at least one container made of nonmagnetic material.

8. In a magnetic transducer as set forth in claim 1 wherein each bobbin of said first and second bobbins has surfaces forming a third indentation on the side of said bobbins opposite the mating side of said bobbins, said third indentation being separated from said second indentation by a portion of said bobbin, two passageways extending longitudinally through said portion separating said second and third indentations and in communication with said second and third indentations, and the first end of the coil in said second indentation passes through one of said passageways to said third indentation and the second end of said coil passes through the second of said passageways to said third indentation.

9. In a magnetic transducer as set forth in claim 8 wherein two terminal posts are mounted in the bottom of said third indentation, and said first end of said coil is connected to one of said terminal posts and said second end of said coil is connected to the second of said terminal posts.

10. In a magnetic transducer as set forth in claim 1 wherein each bobbin of said first and second bobbins has a tubular sleeve extending longitudinally outward from the end of said bobbin opposite said confronting tips of said L-shaped pole pieces, and said tubular sleeve extends through said case positioned around said subassembly.

11. In a magnetic transducer as set forth in claim 10 wherein each bobbin of said first and second bobbins has surfaces forming a third indentation on the side of said bobbins opposite the mating side of said bobbin, said third indentation being separated from said second indentation by a portion of said bobbin, two passageways extending longitudinally through said portion separating said second and third indentations and in communication with said second and third indentations, the first end of the coil in said second indentation passes through one of said passageways to said third indentation, the second end of said coil passes through the second of said passageways to said third indentation, and said tubular sleeve communicates with said third indentation.

12. In a magnetic transducer as set forth in claim 11 wherein two terminal posts are mounted in the bottom of said third indentation, and said first end of said coil is connected to one of said terminal posts and said second end of said coil is connected to the second of said terminal posts.

13. In a magnetic transducer as set forth in claim 1 wherein portions of corresponding edges of the second legs of the L-shaped pole pieces form a generally V-shaped groove with said confronting tips being at the bottom of said V-shaped groove, said corresponding edges being the inner edges of said second legs so as to concentrate magnetic flux at said confronting tips of said L-shaped pole pieces.

14. In a magnetic tranducer as set forth in claim 1 wherein the first and the second L-shaped pole pieces are comprised of a plurality of generally L-shaped magnetic laminations having first legs alternating between long first legs and shorter first legs, each longer first leg of an L-shaped magnetic lamination in said first L-shaped pole piece being arranged to correspond to a short first leg of an L-shaped magnetic lamination in said second L-shaped pole piece, and the rectangular shaped magnetic laminations being positioned to contact the end edge of a short first leg of one L-shaped magnetic lamination in one pole piece and a side edge of the corresponding long first leg of the L-shaped magnetic lamination in the other pole piece.

15. In a magnetic transducer as set forth in claim 14 wherein the number of said L-shaped magnetic laminations in each of said L-shaped pole pieces is equal, and the number of said rectangular shaped laminations is equal to the number of said L-shaped magnetic laminations in each of said L-shaped pole pieces.

16. In a magnetic transducer as set forth in claim 14 wherein the width of each rectangular magnetic lamination is equal to the difference in length between adjacent long and short first legs.

17. In a magnetic transducer as set forth in claim 14 wherein each bobbin of said first and second bobbins has surfaces forming a tubular sleeve extending longitudinally outward from the end of said bobbin opposite said confronting tips of said L-shaped pole pieces, and said tubular sleeve extends through said case positioned around said subassembly.

18. In a magnetic transducer as set forth in claim 17 wherein each bobbin of said first and second bobbins has a third indentation on the side of said bobbins opposite the mating side of said bobbin, said third indentation being separated from said second indentation by a portion of said bobbin, two passageways extending longitudinally through said portion separating said second and third indentations and in communication with said second and third indentations, the first end of the coil in said second indentation passes through one of said passageways to said third indentation, the second end of said coil passes through the second of said passageways to said third indentation, and said tubular sleeve communicates with said third indentation.

19. In a magnetic transducer as set forth in claim 18 wherein two terminal posts are mounted in the bottom of said third indentation, and said first end of said coil is connected to one of said terminal posts and said second end of said coil is connected to the second of said terminal posts.

20. In a magnetic transducer as set forth in claim 14 wherein portions of corresponding edges of the second legs of the L-shaped pole pieces form a generally V-shaped groove with said confronting tips being a the bottom of said V-shaped groove, said corresponding edges being the inner edges of said second legs so as to concentrate magnetic flux at said confronting tips of said L-shaped pole pieces.

21. In a magnetic transducer as set forth in claim 20 wherein each bobbin of said first and second bobbins has a tubular sleeve extending longitudinally outward from the end of said bobbin opposite said confronting tips of said L-shaped pole pieces, and said tubular sleeve extends through said case positioned around said subassembly.

22. In a magnetic transducer as set forth in claim 21 wherein each bobbin of said first and second bobbins has surfaces forming a third indentation on the side of said bobbins opposite the mating side of said bobbin, said third indentation being separated from said second indentation by a portion of said bobbin, two passageways extending longitudinally through said portion separating said second and third indentations and in communication with said second and third indentations, the first end of the coil in said second indentation passes through one of said passageways to said third indentation, the second end of said coil passes through the second of said passageways to said third indentation, and said tubular sleeve communicates with said third indentation.

23. In a magnetic transducer as set forth in claim 22 wherein two terminal posts are mounted in the bottom of said third indentation, and said first end of said coil is connected to one of said terminal posts and said second end of said coil is connected to the second of said terminal posts.

References Cited

UNITED STATES PATENTS

| | | | |
|---|---|---|---|
| 2,584,984 | 2/1952 | Camras | 179—100.2 |
| 2,846,517 | 8/1958 | Farrand et al. | 179—100.2 |
| 3,080,642 | 3/1963 | Woods et al. | 179—100.2 |
| 3,243,788 | 3/1966 | Maclay | 346—74 |

BERNARD KONICK, Primary Examiner

W. F. WHITE, Assistant Examiner

U.S. Cl. X.R.

179—100.2; 346—74